United States Patent Office 3,709,873
Patented Jan. 9, 1973

3,709,873
PROCESS FOR SYNTHESIZING THE DI-ESTERS OF CONDENSED PHOSPHORIC ACID
Yasuo Fujimoto, Machida-shi, Japan, assignor to Kyowa Hakko Kogyo Co., Ltd., Tokyo, Japan
No Drawing. Filed Apr. 9, 1969, Ser. No. 814,844
Claims priority, application Japan, Apr. 11, 1968, 43/23,707
Int. Cl. C07c 69/32; C07d 51/50
U.S. Cl. 260—211.5 R     12 Claims

ABSTRACT OF THE DISCLOSURE

Die-esters of condensed phosphoric acid having the general formula

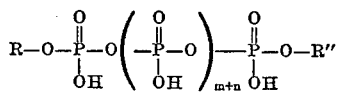

wherein both R and R″ represent: organic radicals such as alkyl, cycloalkyl or aryl; sugar residues such as imidazole type-, flavin type-, pyridine type-, pyrimidine type- or purine type- nucleosides, or mono- or oligo-saccharides; amino acid residues; vitamin residues; steroid residues and the like; and wherein $m$ and $n$ represent integers such as 0, 1, 2, 3 and the like, are produced by reacting a mono-ester of mono- or oligo-phosphoramidate or a salt thereof or a di-ester of mono- or oligo-phosphoric acid or a salt thereof with a mono-ester of mono- or oligo-phosphoric acid or a salt thereof in the presence of a solvent comprising a tri-ester or tri-esters of phosphoric acid.

---

This invention relates to a process for synthesizing di-esters of condensed phosphoric acid having the general formula,

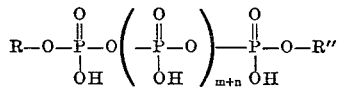

wherein R and R″ represent: organic residues of an alkyl group, a cycloalkyl group or an aryl group; a sugar residue including imidazole type-, flavin type-, pyridine type-, pyrimidine type- or purine type-nucleosides, or mono- or oligo-saccharides; an amino acid residue; a vitamin residue; or a steroid residue and the like; and wherein $m$ and $n$ are integers such as 0, 1, 2, 3 and the like. More particularly, it relates to a process for synthesizing the above-described di-esters of condensed phosphoric acid, in the presence of a solvent comprising a tri-ester or tri-esters of phosphoric acid by reacting a mono-ester or salt of a mono-ester of a mono- or oligo-phosphoramidate, the mono-ester having the general formula,

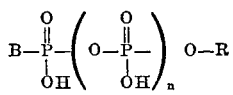

wherein R and $n$ are the same as defined above; and wherein B is a primary, secondary or tertiary amino group or cyclic-organic base; or by reacting a di-ester or salt of a di-ester of a mono- or oligo-phosphoric acid, the di-ester having the general formula,

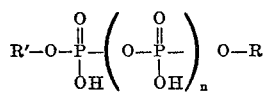

wherein R and $n$ are the same as defined above, and wherein R′ is an α-, β- or γ-pyridyl group, with a mono-ester or salt of a mono-ester of a mono- or oligo-phosphoric acid, the mono-ester having the general formula,

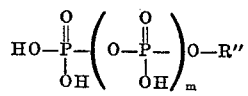

wherein R″ and $m$ are the same as defined above.

It has already been proposed to synthesize di-esters of condensed phosphoric acid by condensing phosphoramidates and mono-esters of phosphoric acid. For example, several of these proposed processes appear in the following articles:

H. G. Khorana et al, J. Am. Chem. Soc., 80, 3756 (1958), 83 659 (1961);
A. L. Nussbaum et al., Tetrahedron, 20 2467 (1964);
N. K. Kochetkov et al., Tetrahedron, 19, 1207 (1963);
Y. Furukawa et al., Chem. Pharm. Bull., Japan, 13, 16 (1965); and
J. G. Moffatt et al., J. Am. Chem. Soc. 88, 838 (1966).

All of these processes, however, suffer from one or more disadvantages. For example, the reaction times are excessively long, the reactions do not go to completion and large amounts of by-products are produced in addition to the desired di-esters and the yields are undesirably low; the yield of the desired product after the reaction is generally from about 20 to 80% while the isolated product yield is about 18 to 70%.

Accordingly, one of the objects of the present invention is to provide an improved process for the synthesis of di-esters of condensed phosphoric acid which overcomes the disadvantages and deficiencies of the prior art methods.

Another object of the present invention is to provide a process for the synthesis of di-esters of condensed phosphoric acid which may be carried out in an efficacious and economical manner.

A further object of this invention is to provide a process for synthesizing higher yields of di-esters of condensed phosphoric acid in a shorter time than possible by prior art methods.

These and other objects of the present invention will become apparent to those skilled in the art from a reading of the following specification and claims.

Through varied study and experimentation the present inventor has found that the disadvantages in the conventional processes can be improved by using a tri-ester or tri-esters of phosphoric acid as a reaction solvent. In this manner, such problems as difficult solubility of starting materials, requirement of long reaction time (since the reaction is violent at elevated temperatures, prior art processes are carried out at room temperature which requires about 3 to 4 days for normal yields), production of various by-products even at room temperature and low reaction yields may be improved. In addition, the reaction yield may be further increased by heating the reaction mixture up to about 70° C., since the solubility of starting materials increases and the decomposition of a resultant di-ester of condensed phosphoric acid is prevented by the use of an organic tri-ester or tri-esters of phosphoric acid as the reaction solvent. In this regard, the inventor has found that a condensed phosphoric ester can be obtained in as short a time as 2 to 5 hours, in yields as high as about 90% or more by conducting the reaction at about 50° C.

Thus, in accordance with the present invention, di-esters of condensed phosphoric acid may be obtained by carrying out a reaction between an ester or salt of an ester of mono- or oligo-phosphoramidate, (I), or an ester or salt of an ester of pyridyl mono- or oligo-phosphate, (II), the esters having the general formulas, (I)
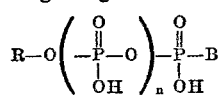

and (II)
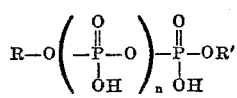

respectively, wherein R, R', n and B are the same as defined above, and a mono-ester or salt of a mono-ester of mono- or oligo-phosphoric acid, (III), the ester having the general formula, (III)
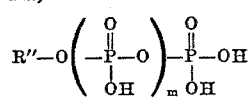

wherein R" and m are the same as defined above, in the presence of a reaction solvent comprising an organic tri-ester or tri-esters of phosphoric acid, at a temperature up to about 70° C., followed by purifying the reaction mixture (solution or suspension) with or without the addition of water thereto according to a conventional method.

As the starting materials that may be used in the present invention, all of the esters of mono- or oligo-phosphoramidates, esters of pyridyl mono- or olig-phosphates and mono-esters of mono- or oligo-phosphoric acid may be used. That is, as R and R", mono- or oligo-phosphoric compounds containing an alkyl, cycloalkyl, aryl residue or residues; containing a sugar residue or residues in the molecule such as ribonucleoside residues or deoxyribonucleoside residues of imidazole type, pyridine type, pyrimidine type, flavin type- and purine type, as well as various pentosyl-, deoxypentosyl-, hexosyl-, deoxyhexosyl-, and heptosyl-nucleoside residues of the about 5 types or residues of derivatives thereof or sugar residues such as pentose, deoxypentose, hexose, deoxyhexose, heptose, deoxyheptose and oligosaccharose and the like or residues of derivatives thereof (those in which a phosphoric group is bonded with an OH radical on any position in said sugars may be used); containing residues of amino acids such as N-substituted serines, N-substituted threonine, N-substituted hemoserines, N-substituted β-hydroxyglutamic acids, N-substituted β-hydroxyaspartic acids, N-substituted γ-hydroxyproline, N-substituted γ-hydroxylysines and the like; or containing residues of vitamin derivatives such as pyridoxine, pyridoxal, pyridoxamine, thiamine, pantethine, pantothenoic acid, pantothenonitrile, pantetheine, and derivatives thereof and the like; or containing residues of steroid derivatives such as testosterone, prednisolone, pregnenolone, estriol, estradiol, cholesterol and the like may be used.

As the typical examples of the compounds defined above, there are enumerated phosphoric esters such as adenosine-5'-phosphate,
adenosine-2'-phosphate,
adenosine-3'-phosphate,
deoxyadenosine-5'-phosphate,
deoxyadenosine-3'-phosphate,
adenosine-2',3'-cyclic-phosphate-5'-phosphate,
adenosine-5'-diphosphate,
adenosine-5'-triphosphate,
guanosine-5'-phosphate,
guanosine-5'-diphosphate,
guanosine-5'-triphosphate,
deoxyguanosine-5'-phosphate,
deoxyguanosine-5'-diphosphate,
deoxyguanosine-5'-triphosphate,
inosine-5'-phosphate,
inosine-5'-diphosphate,
inosine-5'-triphosphate,
xanthosine-5'-phosphate,
xanthosine-5'-diphosphate,
xanthosine-5'-triphosphate,
uridine-5'-phosphate,
uridine-5'-diphosphate,
uridine-5'-triphosphate,
deoxyuridine-5'-phosphate,
deoxyuridine-5'-diphosphate,
deoxyuridine-5'-triphosphate,
cytidine-5'-phosphate,
cytidine-5'-diphosphate,
cytidine-5'-triphosphate,
deoxycytidine-5'-phosphate,
deoxycytidine-5'-diphosphate,
deoxycytidine-5'-triphosphate,
thymidine-5'-phosphate,
thymidine-5'-diphosphate,
thymidine-5'-triphosphate,
nicotinamide ribonucleoside-5'-phosphate,
5-amino-4-imidazolecarboxamide ribonucleoside-5'-phosphate,
5-amino-4-imidazolecarboxamide ribonucleoside-5'-phosphate,
3-isoadenosine-5'-phosphate,
pseudouridine-5'-phosphate,
5-halogenouridine-5'-phosphate,
6-mercaptopurine ribonucleoside-5'-phosphate,
6-azauridine-5'-phosphate,
8-azaguanosine-5'-phosphate,
8-azaadenosine-5'-phosphate,
N-acyladenosine-5'-phosphate,
N-acylguanosine-5'-phosphate,
N-acylcytidine-5'-phosphate,
thymidylyl-(5'→3')-thymidine-5'-phosphate,
thymidylyl-(5'→3')-2'-deoxyadenosine-5'-phosphate,
2'-deoxycytidylyl-(5'→3')-thymidine-5'-phosphate,
adenylyl-(5'→3')-adenosine-5'-phosphate,
adenylyl-(5'→3')-guanosine-5'-phosphate,
uridylyl-(5'→3')-adenosine-5'-phosphate,
guanylyl-(5'→3')-cytidine-5'-phosphate,
thymidylyl-(5'→3')-thymidylyl-(5'→3')-thymidine-5'-phosphate,
2'-deoxycytidylyl-(5'→3')-deoxyadenylyl-(5'→3')-thymidine-5'-phosphate,
α,D-glucose-1-phosphate,
α-D-glucose-6-phosphate,
N-acetyl-α-D-glucosamine-1-phosphate,
α-D-galactose-1-phosphate,
α-D-glucuronic acid-1-phosphate,
α-D-mannose-1-phosphate,
α-D-ribose-1-phosphate,
α-D-deoxyribose-1-phosphate,
α-L-fucose-1-phosphate,
glycerol-1-phosphate (glycerophosphate),
riboflavin mononucleotide,
pyridoxine-5-phosphate,
pyridoxamine-5-phosphate,
pyridoxal-5-phosphate,
thiamine-monophosphate ester
S-substituted thiamine-monophosphate ester,
(+)-pantetheine-4'-phosphate,
pantethine 4,4'-bisphosphate,
pantoethenoyl 4'-phosphate,
pantoethenonitrile 4'-phosphate,
thiamine-diphosphate,
prednizolone-21-phosphate,
testosterone-17-phosphate,
estriol-17-phosphate,
pregnenolone-3-phosphate,
cholesterol-3-phosphate,
estradiol-17-phosphate,
p-nitrobenzyl phosphate,
2-cyanoethyl phosphate,
O-phosphoryl-N-acetylserine,
O-phosphoryl-N-(t-butyloxycarbonyl)-serine,
O-phosphoryl-N-carbobenzoxyserine, O-phosphoryl-N-acetylthreonine,
O-phosphoryl-N-(t-butyloxycarbonyl)-threonine,
O-phosphoryl-N-carbobenzoxy-threonine,
O-phosphoryl-N-acetyl-$\beta$-hydroxyaspartic acid,
O-phosphoryl-N-(t-butyloxycarbonyl)-$\beta$-hydroxyaspartic acid,
O-phosphoryl-N-carbobenzoxy-$\beta$-hydroxaspartic acid,
O-phosphoryl-N-acetyl-$\beta$-hydroxyglutamic acid,
O-phosphoryl-N-(t-butyloxycarbonyl)-$\beta$-hydroxyglutamic acid,
O-phosphoryl-N-carbobenzoxy-$\beta$-hydroxy-glutamic acid,
O-phosphoryl-$N^\alpha,N^\epsilon$-diacetyl-$\gamma$-hydroxylysine,
O-phosphoryl-$N^\alpha,N^\epsilon$-di-(t-butyloxycarbonyl)-$\gamma$-hydroxylysine,
O-phosphoryl-$N^\alpha,^\epsilon$-di-(carbobenzoxy)-$\gamma$-hydroxylysine,
O-phosphoryl-N-acetyl-$\gamma$-hydroxyproline,
O-phosphoryl-N-(t-butyloxycarbonyl)-$\gamma$-hydroxyproline,
O-phosphoryl-N-carbobenzoxy-$\gamma$-hydroxyproline and their phosphoramidates, in which one of the free hydroxyl groups in the phosphoric group is substituted by an amino group. As said amino group, in addition to the —NH$_2$ group, aliphatic, alicyclic (cycloaliphatic), aromatic or heterocyclic secondary or tertiary amino (amine) groups, for example, mono- or di-substituted amino groups such as mono- (or di-) methylamino, mono- (or di-) ethylamino, mono- (or di-) propylamino (including isomers thereof), mono- (or di-) butylamino (including isomers thereof), mono- (or di-) cyclohexylamino, anilino, diphenylamino, monotolylamino (toluidino), ditolylamino (including isomers thereof), mono- (or di-) benzylamino, mono- (or di-) xylylamino (including isomers thereof), N-alkylanilino (e.g., N-methylanilino, N-ethylanilino), N-alkyltoluidino (including isomers thereof), mono- (or di-) naphthylamino groups (including isomers thereof) and the like, morpholino, piperidino, pyrrolidino, piperazino, imidazolo (glyoxalino) groups and the like may be employed.

As phosphoric acid pyridyl di-esters (esters of pyridylphosphates), those in which hydrogen of one of the free hydroxyl groups in the phosphoric group is substituted by a pyridyl group and its derivatives and which are bonded on the $\alpha$-, $\beta$-, or $\gamma$-position of the pyridyl group are used.

Inorganic or organic salts of the above derivatives of phosphoric acid may be used. These salts may include, for example, the lithium salt, ammonium salt, sodium salt, potassium salt, trimethylamine salt, triethylamine salt, tri-n-propylamine salt (including its isomer amine salt), tri-n-butylamine salt (including its isomer amine salts), cyclohexylamine salt, piperidine salt, pyridine salt, dicyclohexylguanidine salt, 4-morpholino-N,N'-dicyclohexylcarboxamidine salt and the like. However, it is usually desirable to use an organic amine salt since its solubility in a reaction solvent is higher.

As the organic tri-esters of phosphoric acid which are a characteristic of the process of the present invention, not only aliphatic tri-esters of phosphoric acid, such as trimethyl phosphate, triethyl phosphate, tri-n-propyl phosphate or its isomer, tri-n-butyl phosphate or its isomers, tri-n-amyl phosphate or its isomers, tri-hexyl phosphate and the like, but also aromatic tri-esters of phosphoric acid, such as tri-o-cresyl phosphate, tri-m-cresyl phosphate, tri-benzyl phosphate and the like, or alicyclic tri-esters of phosphoric acid, such as tricyclohexyl phosphate, tricyclopentyl phosphate and the like may be used. It is preferred that the tri-esters be liquid at room temperature so as to provide easy treatment after the reaction has been completed, however, phosphates which become liquid when heated may also be used.

The present condensation reaction may be carried out in a period of from a few days to a few weeks at room temperature or below as in conventional processes, however, the reaction time can be shortened by heating up to about 70° C. For example, by carrying out the reaction at 50° C. the reaction may be accomplished in from about 1 to 5 hours. In this regard, if the reactants and products remain in contact for a long period of time after the reaction is accomplished, side reactions tend to occur. It is, therefore, desirable to carry out the reaction for a period of time no longer than necessary and to separate the desired product from the unreacted starting material as soon after the reaction ceases as is convenient.

When the process of the present invention is practiced in a solvent comprising an organic tri-ester of phosphoric acid, it is not particularly necessary to add any other or additional solvents. However, an addition of various diluents or solvents which are, of course harmless to the reaction may be also permitted. For instance, solvents which have been heretofore used, such as dimethyl formamide, diethyl formamide, dimethylacetamide, diethyl acetamide, dimethyl sulfoxide, diethyl sulfoxide, o-chlorophenol, cresol (and isomers thereof), tricresol (cresol mixtures), acetonitrile, propionitrile, butyronitrile, valeronitrile, capronitrile, benzonitrile, tolunitrile, and the like may be added.

The di-esters of condensed phosphoric acid which are obtained by the above process can be purified by known conventional methods. It is advantageous to separate the desired product in the form of an alkali metallic salt such as lithium, sodium and the like, however, it is also possible to isolate the end product as a relatively insoluble salt such as a calcium salt, barium salt, mercury salt or the like and to convert it to a free acid or a soluble alkali metallic salt. The di-ester may also be purified, isolated and converted to a salt by treating the reaction mixture with active charcoal, ion-exchange resins, ion-exchange cellulose derivatives, or ion-exchange Sephadex (trade name) derivatives and the like to adsorb and elute the di-esters of condensed phosphoric acid contained in the reaction mixture, and then by treating in accordance with the conventional methods. In this regard, the adsorption treatment may be performed directly on the reaction mixture, on a mixture of the reaction mixture and water or on an aqueous solution prepared by mixing water with a precipitate obtained by adding ether, halogenated hydrocarbons, ketones or the like to the reaction mixture. Moreover, since the amount of the di-esters present in the reaction mixture prepared in accordance with the present invention is extremely high, a large yield of a high purity product may be obtained by performing the above-described adsorbing and eluting treatment only once.

The di-esters of condensed phosphoric acid obtained in accordance with the present invention may be used as coenzymes, medicines or biochemical reagents.

Several examples are enumerated below to illustrate the embodiments of the process of the present invention.

EXAMPLE 1

To 180 mg. (0.3 mmole) of N,N'-cyclohexylcarboxamidinium adenosine-5'-phosphoramidate and a tri-n-butylammonium riboflavin-5'-phosphate which was separately prepared from 575 mg. of pyridinium riboflavin-5'-phosphate by a procedure in which anhydrous benzene containing 370 mg. (2 mmoles) of tri-n-butylamine was added to a pyridinium salt and pyridine was then removed by repeating an azeotropic evaporation procedure under reduced pressure with anhydrous benzene, were added to 30 ml. of tri-n-propyl phosphate. After the mixture was left to stand for 4 days at a dark place, the mixture was mixed with 50 ml. of water, and extracted three times each with 50 ml. of chloroform. The pH of the aqueous layer was adjusted to about 7, and the aqueous solution was passed through a column (4 x 15 cm.) of DEAE-cellulose (Cl− type). After washing the cellulose column with water, a 0.005 N HCl-0.015 N LiCl solution was passed therethrough to remove mononucleotides and a 0.005 N HCl-0.035 N LiCl solution was then passed therethrough in as short a period of time as possible to elute a flavin-adenine dinucleotide (FAD) fraction. This fraction was neutralized with triethylamine, concentrated in vacuo, mixed with 20 ml. of methanol, and then mixed with 400 ml. of acetone and 40 ml. of ether to give a precipitate. To the thus obtained product, orange precipitate, 4 ml. of methanol were added with stirring, and then 40 ml. of acetone and 4 ml. of ether were added for washing. Finally, the precipitate was dissolved with water and the solution was freeze-dried to give 122 mg. of a lithium salt of FAD ($Li_2FAD$).

EXAMPLE 2

To 383 mg. (1 mmole) of adenosine-5'-phosphate ($2H_2O$), 10 ml. of anhydrous pyridine and 706 mg. (2 mmoles) of tri-n-octylamine were added. The mixture was then evaporated in vacuo, and water and pyridine were then removed therefrom by repeating a dehydration procedure comprising the addition and the evaporation of pyridine three times and the removal of pyridine by means of an azeotropic evaporation using anhydrous benzene. To the thus obtained product, 430 mg. (0.5 mmole) of well-dried prednizolone-21-phosphoromorpholidate was added and 50 ml. of tricyclohexyl phosphate containing 0.5 mmole of tri-n-octylamine was further added. The mixture was heated at 60° C. for about 5 to 10 hours, cooled and extracted three times each with 50 ml. of water and 50 ml. of ether. The aqueous layers were collected and concentrated in vacuo to about 15 ml. After adjusting the pH of the concentrate to about 7.5, the concentrate was passed through a column (2 x 30 cm.) of DEAE-cellulose ($HCO_3$-type). The column was washed with water and was then eluted by an ion-exchange chromatography according to a linear gradient method using 5 l. of water and 5 l. of 0.15 M triethyl ammonium hydrogen carbonate having a pH of about 7.5. The fractions containing the desired dinucleotide were collected and the thus obtained fraction was evaporated in vacuo to dryness to obtain 350 mg. of powdered prednizolone-adenosine diphosphate [$P^1$-(prednizolone-21), $P^2$-(adenosine-5') pyrophosphate]. The product showed a single spot of Rf 0.59 on paper chromatography using isopropanol-$NH_3$—$H_2O$ (7:1:2).

EXAMPLE 3

To 492 mg. (2 mmoles) of well-dried pyridoxal-5-phosphate, 1.42 g. of tri-n-octylamine was added. To the thus prepared mixture, 50 ml. of tri-methyl phosphate and 374 mg. (1 mmole) of adenosine-5'-phosphoroethylamidate were added and a reaction was carried out at 40° C. for 8 hours. After adding 50 ml. of water to the reaction mixture, the mixture was extracted three times each with 50 ml. of ether at a dark place. The resulting aqueous layer was passed through a column (2 x 7 cm.) of DEAE-Sephadex (trade name) (Cl-type). The column was washed with water, and 0.003 N HCl-0.015 N LiCl was passed therethrough to remove mononucleotides. Thereafter, the main desired fraction was eluted with 0.005 N HCl-0.05 N LiCl. The fraction was concentrated in vacuo, and 100 ml. of methanol-acetone (2:5) was added to the residual concentrate to precipitate a slightly yellow Li salt of pyridoxal adenosine diphosphate [$P^1$-(pyridoxal-5), $P^2$-(adenosine-5') pyrophosphate]. The resulting precipitate was washed with ether and dried to obtain 328 mg. of crystals.

EXAMPLE 4

221 mg. of well-dried 4-morpholine-N,N'-dicyclohexylcarboxamidinium adenosine-5'-α-pyridyl phosphate-α-pyridyl ester and 445 mg. of tri-n-butylammonium α-D-glucose-1-phosphate were added to 10 ml. of tri-n-butyl phosphate and the mixture was left to stand at 40° C. for one day. After adding the 10 ml. of water containing 120 mg. of lithium acetate, the mixture was extracted three times with ether. The resulting aqueous layer was passed through a column (1.5 x 10 cm.) of Dowex-1 x 2 (trade name) (Cl type), and the column was washed with water. α-D-glucose-1-phosphate, AMP and $P^1$, $P^2$-di(adenosine-5') diphosphate were eluted with 0.0075 N HCl and then the desired product (ADPG) was eluted wtih 0.01 N HCl-0.025 N LiCl solution. The ADPG fraction was neutralized with LiOH, concentrated in vacuo, and 25 ml. of methanol and 120 ml. of acetone were then added to the concentrate to give a precipitate. The thus obtained precipitate was washed with methanol-acetone and dried to obtain 151 mg. of a lithium salt of $P^1$-(adenosine - 5'), $P^2$ - (α - D - glucose - 1) pyrophosphate ($Li_2ADPG\ 5\ H_2O$).

EXAMPLE 5

213 mg. of well-dried 4-morpholine-N,N'-dicyclohexylcarboxamidinium uridine-5'-phosphate-α-pyridyl ester and 445 mg. of tri-n-butylammonium α-D-glucose-1-phosphate were added to 10 ml. of triethyl phosphate. The thus prepared mixture was left to stand at 30° C. for 2 to 3 days, added with 10 ml. of water, and extracted three times with ether. The resulting aqueous layer was passed through a column (2 x 10 cm.) of DEAE-Sephadex (trade name) (Cl-type) and the column was washed with water. After UMP was eluted with 0.003 N HCl-0.02 N LiCl, the UDPG fraction was eluted with 0.003 N HCl-0.06 N LiCl. The resulting UDPG fraction was adjusted to pH 4.0 with LiOH, evaporated in vacuo to dryness, dissolved in 5 ml. of methanol, and then added with a mixed solution of 35 ml. of acetone and 5 ml. of ether to give a white precipitate. The thus resulting precipitate was dissolved again in 3 ml. of methanol and added with a mixed solution of 30 ml. of acetone and 5 ml. of ether to give another precipitate. The second precipitate was washed with ether and dried in vacuo at a room temperature to obtain 158 mg. of a lithium salt of $P^1$ - (uridine - 5'), $P^2$-(α-D-glucose-1) pyrophosphate ($Li_2UDPG \cdot 6H_2O$).

EXAMPLE 6

520 mg. of dicyclohexylguanidinium cytidine-5'-phosphoramidate and 150 mg. of O-phosphoryl-N-carbobenzoxy-L-serine were added to 50 ml. of tribenzyl phosphate and the thus prepared mixture was left to stand at 40° C. for 1 day. After adding 50 ml. of water, the reaction mixture was then extracted three times each with 50 ml. of ether. The resulting aqueous layer was passed through a column of Dowex-1, X–8 (trade name) (HCOO-form) and the resin was washed with water, and washed with 3 l. of 1 N HCOOH-0.2 M $HCOONH_4$. After the UV absorption of the effluent disappeared, about 2 l. of 2 N HCOOH-0.2 M $HCOONH_4$ was passed through the column to elute CDP-N-carbobenzoxy-L-serine. The thus obtained fraction was passed through a column of 1 g. of active charcoal to adsorb the desired product, the charcoal was washed with water, and eluted with concentrated $NH_4OH$—$H_2O$—EtOH (0.5:50:50). The eluate was concentrated in vacuo to dryness to obtain CDP-N-carbobenzoxy-L-serine with the yield of 80% (calculated from the L-serine). To this product, 50 ml. of 30% MeOH and 100 mg. of 10% Pd—C were added and a catalytic reduction was carried out for 8 hours. After filtering, 20 ml. of concentrated $NH_4OH$—$H_2O$—EtOH (0.5:50:50) was added to the residual cake to elute the desired product. The filtrate and eluate were gathered and concentrated. After the concentrated solution was passed through 10 ml. of column of Dowex-1, X–3 (trade name) (HCOO-type), the resin was washed with water, and then eluted with 0.1 N HCOOH. (about 100 ml.). The fraction containing CDP-L-serine was collected, adsorbed onto 1 g. of active charcoal, washed with water, and was then eluted with 100 ml. of concentrated $NH_4OH$—$H_2O$—EtOH (0.5:50:50). The eluate was concentrated in vacuo and added with 100 mg. of $Ba(OAC)_2 \cdot H_2O$. After the barium acetate was dissolved, ethanol was added to precipitate about 200 mg. of barium salt of CDP-L-serine ($C_{12}H_{18}O_3N_4P_2Ba \cdot C_2H_5OH \cdot H_2O$).

EXAMPLE 7

0.5 g. of dicyclohexylguanidinium 2′-deoxycytidine-5′-phosphoramidate and 150 mg. of O-phosphoryl-N-carbobenzoxy-L-serine were added to 50 ml. of triethyl phosphate, the mixture was left to stand at 40° C. for 1 to 2 days, and treated in a manner similar to that described in Example 7 to yield 150 mg. of a barium salt of 2′-deoxycytidine-5′-diphosphate-L-serine (dCDP-L-serine) (½ ethanol·5H$_2$O).

EXAMPLE 8

117 mg. (0.1 mmole) of a di(4-morpholine-N,N′-dicyclohexylcarboxamidinium) salt of P$^1$-(guanosine-5′), P$^2$-(4-morpholine)-pyrophosphate (GDP - morpholidate) (water of crystalliaztion: 4 molecules) was well dehydrated by an azeotropic distillation in vacuo. The azeotropic vacuum distillation was performed three times using pyridine and two times using anhydrous benzene. Separately, 293 mg. (0.4 mmole) of tributylammonium guanosine-5′-phosphate was dried using the same dehydration procedure.

Both of these dried compounds were added to 20 ml. of triethyl phosphate and the thus prepared mixture was left to stand at room temperature (about 25° C.) for several days. After adding 25 ml. of water, the mixture was fed into a column (2 x 35 cm.) of DEAE cellulose (HCO$_3$-type), washed thoroughly with water, and then eluted by a linear gradient method using 3.5 l. of triethylammonium hydrogen carbonate (0.005 to 0.5 M). Fractions containing GDP-morpholidate and GMP as the first peak, GDP as the second peak and GP$_3$G as the third peak were obtained (Yield 82%). The third fraction was evaporated in vacuo to dryness, and 25 ml. of methanol was added to the residue, and evaporated in vacuo to dryness. A similar evaporation procedure was carried out 4 times. Finally, the thus obtained product was dissolved in 5 ml. of methanol, and mixed with an acetone solution containing 1 M of sodium iodide in an amount equivalent to 2 times the phosphoric radical. 25 ml. of acetone was further added to the mixture and the resulting white precipitate was washed with acetone and dried in vacuo to obtain a sodium salt of P$^1$, P$^3$-di(guanosine-5′) triphosphate.

EXAMPLE 9

830 mg. of bis-(tri-n-octylammonium) D-mannose-α-1-phosphate and 320 mg. of 4-morpholine-N,N′-dicyclohexylcarboxamidinium guanosine-5′-phosphoromorpholidate were added to 25 ml. of tri-o-cresyl phosphate and the reaction was carried out at a room temperature for 3 to 4 days. After the reaction mixture was treated by the same procedure as described in Example 2, the resulting aqueous layer was passed through a column (2 x 30 cm.) of DEAE-Sephadex (trade name) (HCO$_3$-type), the column was washed with water, and then eluted by a linear gradient method using 3 l. of 0.005 M, pH 7.5, triethylammonium hydrogen carbonate and 3 l. of 0.15 M, pH 7.5, triethyl ammonium hydrogen carbonate. The resulting main fraction was evaporated in vacuo to dryness and dissolved in 10 ml. of water. The resultant solution was evaporated in vacuo to dryness. The evaporation procedure was repeated again. After the residue was dissolved in a small amount of water, the solution was adsorbed on a column (2 x 15 cm.) of Dowex-1 (trade name) (Cl-type), and eluted by a linear gradient method using 3 l. of 0.003 N HCl and 3 l. of 0.003 N HCL-0.15 N LiCl solution. The desired fraction was adjusted to a pH of about 5.0 with LiOH and evaporated in vacuo to dryness.

The residual product was dissolved in a small amount of water and methanol-acetone was added to the solution to obtain a precipitate. The thus obtained precipitate was washed with ether and then dried to obtain 231 mg. of a lithium salt of P$^1$-(guanosine-5′), P$^2$-(α-D-mannose-1) pyrophosphate (Li$_2$GDPM·6H$_2$O).

EXAMPLE 10

221 mg. (0.2 mmole) of bis-(4-morpholine-N,N′-dicyclohexylcarboxamidinium) adenosine-2′,3′-cyclic phosphate-5′-phosphoromorpholidate was well dehydrated by means of an azeotropic distillation in vacuo using anhydrous pyridine and an azeotropic distillation in vacuo using anhydrous benzene. Separately, 368 mg. (0.6 mmole) of barium salt of (+)-pantetheine-4′-phosphate (6H$_2$O) was desalted by an ion exchange method using Dowex-50 (trade name) (H$^+$ type), added with 1.2 mmoles of tri-n-butylamine, and then well dehydrated by means of an azeotropic method using anhydrous pyridine and benzene. Both of the thus prepared dried compounds were dissolved in 10 ml. of triethyl phosphate. The solution was left to stand at room temperature (about 25° C.) for a day and was then concentrated in vacuo. After adding 10 ml. of water, the solution was extracted three times each with 10 ml. of ether and the resulting aqueous layer was evaporated in vacuo to dryness. After the thus dried residue was dissolved in 10 ml. of 0.1 N HCl, the solution was left to stand at room temperature for about 1 hour. The solution was then evaporated in vacuo to dryness, 5 ml. of methanol was added to the residue and the mixture was again evaporated in vacuo to dryness. After repeating the above procedure twice, the residue was dissolved in 3 ml. of water, the solution was adjusted to a pH of about 6.0 with NH$_4$OH and 4 ml. of 2-mercaptoethanol was added to the solution. The mixture was left to stand overnight. The mixture was then diluted with about 50 ml. of water and passed through a column (2 x 30 cm.) of DEAE-Sephadex (trade name) (Cl type). After washing with water, a linear gradient elution was carried out using 1.5 l. of 0.003 N HCl and 1.5 l. of 0.003 N HCl-0.15 N LiCl.

The fraction containing the third peak (included CoA and iso-CoA; yield of about 80%) was collected, was adjusted to a pH of about 4.5 with LiOH and was then evaporated in vacuo to dryness. 5 ml. of methanol and 50 ml. of acetone were added to the residue and the mixture was well stirred. The resulting precipitate was collected and treated again with methanol-acetone. The washing with methanol-acetone was repeated until Cl ion was not observed in the supernatant liquid, and the precipitate was then dried. The thus obtained precipitate was dissolved in 50% aqueous 2-mercaptoethanol and was left to stand overnight at a room temperature. The resulting solution was passed through a column (3.5 x 50 cm.) of ECTEOLA-cellulose (Cl type). The column was washed with water and was then eluted by a linear gradient method using 2.5 l. of 0.03 N LiCl-0.003 N HCl and 0.10 N LiCl-0.003 N HCl. The peak A (iso-CoA) and peak B (CoA) were separately adjusted to a pH of about 4.5 with LiOH, and both of the fractions were separately added with methanol-acetone to make precipitates. In this manner, 39 mg. of a Li salt of CoA (coenzyme A) and 35 mg. of a Li salt of iso-CoA were obtained respectively.

The invention being thus described, it will be obvious that the same may be varied in many ways. Such variations and modifications as would be obvious to one having ordinary skill in the art are deemed to be within the spirit and scope of the principles of the present invention.

What is claimed is:

1. In a process for producing di-esters of condensed phosphoric acid which comprises reacting a member selected from the group consisting of esters of mono-phosphoramidate, esters of oligo-phosphoramidate, di-esters of mono-phosphoric acid, di-esters of oligo-phosphoric acid and salts thereof with a member selected from the group consisting of mono-esters of mono-phosphoric acid, mono-esters of oligo-phosphoric acid and salts thereof, the improvement which comprises effecting said reaction in the presence of a tri-ester of phosphoric acid having the general formula:

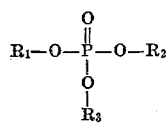

wherein $R_1$, $R_2$ and $R_3$ are selected from the group consisting of lower alkyl radicals, lower cycloalkyl radicals and aryl radicals having a benzene nucleus.

2. The process of claim 1, wherein said di-esters of condensed phosphoric acid comprise the general formula,

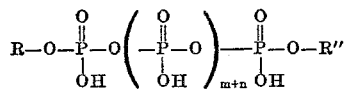

wherein R and R" are organic residues selected from the group consisting of alkyl groups containing from 1 to 4 carbon atoms, cycloalkyl groups containing 6 carbon atoms in the nucleus, aryl groups containing from 6 to 10 carbon atoms in the nucleus, and residues of sugars, amino acids, vitamins, and steroids; said sugar residues being those in which a phosphoric acid group is bonded with an OH group to any position in said sugar, said amino acid residues are selected from the group consisting of N-substituted serines, N-substituted homoserines, N-substituted threonines, N-substituted β-hydroxyaspartic acids, N-substituted β-hydroxyglutamic acids, N-substituted γ-hydroxyproline and N-substituted γ-hydroxylysines, said vitamin residues are selected from the group consisting of residues of pyridoxines, pyridoxals, pyridoxamines, thiamines, pantethines, pantetheines and pantothenoyls, and said steroid residues are selected from the group consisting of residues of testosterones, pregnenolones, prednizolones, estriols, estradiols and cholesterols, and wherein $m$ and $n$ are integers including zero.

3. The process of claim 2, wherein said sugar residues are selected from the group consisting of residues of ribonucleosides, deoxyribonucleosides, pentosyldeoxypentosyl-, hexosyl-, deoxyhexosyl- and heptosyl-nucleosides, pentose, deoxypentose, hexose, deoxyhexose, heptose, deoxyheptose, and oligosaccharose.

4. The process of claim 3, wherein said nucleoside residues are selected from the group consisting of residues of imidazoles, pyridines, pyrimidines, flavins and purines.

5. The process of claim 1, wherein said esters of mono-phosphoramidate and said esters of oligo-phosphoramidate comprise the general formula,

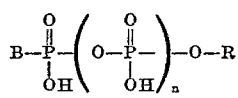

wherein R and $n$ are the same as defined in claim 3 and wherein B is a member selected from the group consisting of primary, secondary and tertiary amino groups containing an organic radical selected from the group consisting of alkyl groups containing from 1 to 4 carbon atoms, cycloalkyl groups containing 6 carbon atoms in the nucleus and aryl groups containing from 6 to 10 carbon atoms in the nucleus and cyclic organic groups selected from the group consisting of morpholino, piperidino, pyrrolidino, piperazino, and imidazolo groups.

6. The process of claim 1, wherein said di-esters of mono-phosphoric acid and said di-esters of oligo-phosphoric acid comprise the general formula,

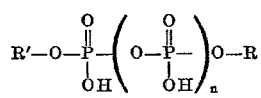

wherein R and $n$ are the same as defined in claim 3 and wherein R' is a member selected from the group consisting of α-, β- and γ-pyridyl.

7. The process of claim 1, wherein said mono-esters of mono-phosphoric acid and said mono-esters of oligo-phosphoric acid comprise the general formula,

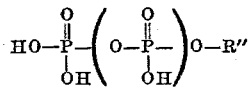

wherein R" and $m$ are the same as defined in claim 3.

8. The process of claim 1, wherein the reactants are maintained at a temperature of from about 0 to 70° C. for about 1 hour to 1 week.

9. A process for producing di-esters of condensed phosphoric acid, which comprises reacting, in the presence of a tri-ester of phosphoric acid, at a temperature from about 0 to 70° C., for a period of from about 1 hour to 1 week, a member, I, selected from the group consisting of esters of mono-phosphoramidate, esters of oligo-phosphoramidate, di-esters of mono-phosphoric acid, di-esters of oligo-phosphoric acid and salts thereof, said esters of mono- and oligo-phosphoramidate comprising the general formula,

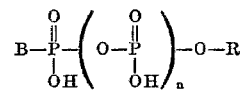

wherein R is an organic residue selected from the group consisting of alkyl groups containing from 1 to 4 carbon atoms, cycloalkyl groups containing 6 carbon atoms in the nucleus, aryl groups containing from 6 to 10 carbon atoms in the nucleus, and residues of sugars, amino acids, vitamins, and steroids; said sugar residues being those in which a phosphoric acid group is bonded with an OH group to any position in said sugar, said amino acid residues are selected from the group consisting of N-substituted serines, N-substituted homoserines, N-substituted threonines, N-substituted β-hydroxyaspartic acids, N-substituted β-hydroxyglutamic acids, N-substituted γ-hydroxyproline and N-substituted γ-hydroxylysines, and vitamin residues are selected from the group consisting of residues of pyridoxines, pyridoxals, pyridoxamines, thiamines, pantethines, pantetheines and pantothenoyls, and said steroid residues are selected from the group consisting of residues of testosterones, pregnenolones, prednizolones, estriols, estradiols and cholesterols wherein $n$ is an integer including zero and wherein B is a member selected from the group consisting of primary, secondary and tertiary amino groups and cyclic organic bases, said di-esters of mono- and oligo-phosphoric acid comprising the general formula,

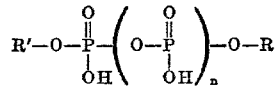

wherein R and $n$ are the same as defined above and wherein R' is a member selected from the group consisting of α-, β- and γ-pyridyl, with a member, II, selected from the group consisting of mono-esters of mono-phosphoric acid, mono-esters of oligo-phosphoric acid and salts thereof, said mono-esters of mono- and oligo-phosphoric acid comprising the general formula,

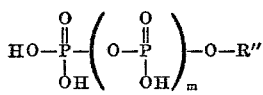

wherein R" and $m$ are the same as R and $n$, respectively.

10. The process of claim 9, wherein I and II are selected from the group consisting of N,N'-di-cyclohexylcarboxamidinium adenosine-5'-phosphoramidate;
the tri-n-butylammonium salt of riboflavin-5'-phosphate;
riboflavin-5'-phosphate;
adenosine-5-phosphate;
prednizolone-21-phosphoromorpholidate;
pyridoxal-5-phosphate;

adenosine-5'-phosphoroethylamidate;
adenosine-5'-phosphate-α-pyridyl ester;
4-morpholine-N,N'-dicyclohexylcarboxamidinium adenosine-5'-phosphate-α-pyridyl ester;
4-morpholine-N,N'-dicyclohexylcarboxamidinium uridine-5'-phosphate-α-pyridyl ester;
tri-n-butylammonium α-D-glucose-1-phosphate;
α-D-glucose-1-phosphate;
dicyclohexylguanidinium cytidine-5'-phosphoramidate;
O-phosphoryl-N-carbobenzoxy-L-serine;
dicyclohexylguanidinium 2'-deoxycytidine-5'-phosphoramidate;
di(4-morpholine-N,N'-dicyclohexylcarbobenzidinium) salt of P$^1$-(guanosine-5'), P$^2$-(4-morpholine)-pyrophosphate (GDP-morpholidate);
tributylammonium guanosine-5'-phosphate;
guanosine-5'-phosphate;
bis-(tri-n-octylammonium) D-mannose-α-1-phosphate;
4-morpholine-N,N'-dicyclohexylcarboxamidinium guanosine-5'-phosphomorpholidate;
bis-(4-morpholine-N,N'-dicyclocarboxamidinium) adenosine-2',3'-cyclic phosphate-5'-phosphomorpholidate and the salt of (+)-pantetheine-4'-phosphate.

11. The process of claim 9, wherein said tri-ester of phosphoric acid is selected from the group consisting of tri-n-propyl phosphate, tricyclohexyl phosphate, tri-methyl phosphate, tri-n-butyl phosphate, triethyl phosphate, tribenzyl phosphate and tri-o-cresyl phosphate.

12. The process of claim 1, wherein the tri-ester of phosphoric acid is selected from the group consisting of trimethyl phosphate, triethyl phosphate, tripropyl phosphate, tributyl phosphate, triamyl phosphate, trihexyl phosphate, tricresyl phosphate, tribenzyl phosphate, tricyclopentyl phosphate and tricyclohexyl phosphate.

References Cited
UNITED STATES PATENTS

| | | | |
|---|---|---|---|
| 3,079,379 | 2/1963 | Tanaka et al. | 260—211.5 |
| 3,082,203 | 3/1963 | Goldman et al. | 260—211.5 |
| 3,299,043 | 1/1967 | Schramm et al. | 260—211.5 |
| 3,321,462 | 5/1967 | Moffatt | 260—211.5 |
| 3,321,463 | 5/1967 | Moffatt | 260—211.5 |
| 3,347,846 | 10/1967 | Yoshikawa et al. | 260—211.5 |
| 3,413,282 | 11/1968 | Yoshikawa et al. | 260—211.5 |
| 3,462,414 | 8/1969 | Wechter | 260—211.5 |
| 3,462,416 | 8/1969 | Hanze et al. | 260—211.5 |

U.S. Cl. X.R.

260—211.3, 211.7, 234 R, 247.2 B, 247.7 D, 256.6, 268 K, 293.9, 293.51, 296 R, 297.5, 309, 326.3, 326.5 A, 397.2, 397.4, 397.5, 933, 941, 944, 959, 978, 982, 971

LEWIS GOTTS, Primary Examiner

J. R. BROWN, Assistant Examiner